United States Patent [19]
Jung

[11] Patent Number: 5,777,983
[45] Date of Patent: Jul. 7, 1998

[54] ASYNCHRONOUS MULTIPORT CONTROLLING TECHNIQUE FOR A SINGLE SYSTEM OF A REMOTE SECURITY ADMINISTRATION SYSTEM

[75] Inventor: Chun-Sul Jung, Gumi, Rep. of Korea

[73] Assignee: SamSung Electronics Co., Ltd., Suwon, Rep. of Korea

[21] Appl. No.: 747,918

[22] Filed: Nov. 12, 1996

[30]     Foreign Application Priority Data

Nov. 9, 1995 [KR] Rep. of Korea ............... 40485/1995

[51] Int. Cl.⁶ ..................... G01R 31/08; H04L 1/00
[52] U.S. Cl. ............ 370/216; 370/218; 370/241; 370/242; 340/825.01
[58] Field of Search .................. 370/216, 241, 370/218, 242, 247, 248, 249; 340/825.01, 825.06, 825.16, 827.17

[56]         References Cited

U.S. PATENT DOCUMENTS

| | | |
|---|---|---|
| 4,404,681 | 9/1983 | Hullwegen ............ 340/825.01 |
| 5,210,746 | 5/1993 | Maher et al. .............. 370/216 |
| 5,235,599 | 8/1993 | Nishimura et al. ....... 340/825.01 |
| 5,386,412 | 1/1995 | Park et al. . |
| 5,398,236 | 3/1995 | Hemmody et al. . |
| 5,502,712 | 3/1996 | Akita . |
| 5,548,639 | 8/1996 | Ogura et al. . |

Primary Examiner—Chi H. Pham
Assistant Examiner—Steven Nguyen
Attorney, Agent, or Firm—Robert E. Bushnell, Esq.

[57]         ABSTRACT

An asynchronous multiport controlling technique in a single processor of a remote security administration system, for example, including a scanning unit, a VAN (value added network) main unit, an X.25 interface module, and a VAN interface module to perform the asynchronous multiport communication with the VAN main unit, in which the asynchronous multiport controlling technique is carried out by collecting extracted VAN-related data from the X.25 interface module, searching out a transmitting port after collecting the VAN-related data, checking to determine whether or not the searched transmitting port is in normal state, generating a suitable request frame for a prescribed format when the transmitting port is in its normal state to transmit the request frame to the VAN main unit via the searched port, and receiving a result frame as many as the allotted number of ports after transmitting the request frame to store the result frame in a single buffer. Thus, several ports are processed in the asynchronous system in the single processor of the remote security administration system, so that the communication is executed in another port even though a port is down while performing the communication, thereby preventing data loss, while the processing with respect to the same operation is reduced to be effective in sharing the load per port.

2 Claims, 4 Drawing Sheets

ASYNCHRONOUS MULTIPORT CONTROLLING TECHNIQUE FOR A SINGLE SYSTEM OF A REMOTE SECURITY ADMINISTRATION SYSTEM

CLAIM OF PRIORITY

This application makes claims all benefits accruing under 35 U.S.C. §119 from an application for ASYNCHRONOUS MULTIPORT CONTROLLING METHOD IN A SINGLE SYSTEM OF A REMOTE SECURITY ADMINISTRATION SYSTEM earlier filed in the Korean Industrial Property Office on 9 Nov. 1995 and there duly assigned Ser. No. 40485/1995.

BACKGROUND OF THE INVENTION

1. Field of the Invention

The present invention relates a technique for controlling a plurality of ports in a remote security administration system, for example, and more particularly to a technique for controlling a plurality of ports in a single processor when communicating by an asynchronous communication system to enable communication even when one port is down.

2. Description of the Related Art

A remote security administration system generally for supervising crime prevention, disaster prevention, gas safety, etc. is maintained and managed by an operator. Since a conventional remote security administration system uses a single asynchronous port in a single processor, a result frame with respect to a request frame should be formed within the same port. Furthermore, if a fault occurs in respective allotted ports, another processor for handling the fault is to be further provided to carry out the administration upon respective ports. Due to this fact, respective allotted ports process the result frame with respect to the request frame, so that utilization of the allotted ports are controlled. For example, it is impossible for the request frame to be transmitted from the allotted A port and the result frame processed in the allotted B port. This is because the A port processes its own operation and the result thereof is desired to be received via the A port, too. Consequently, if a port is down or deadlocked owing to an unpredictable matter after transmitting a request frame, a result frame is not received, thereby incurring a data loss.

The following references have features in common with the present invention but nevertheless do not teach or suggest the specific features of the present invention: U.S. Pat. No. 5,548,639 to Ogura et al., entitled *Distributed Control Of Telecommunication Network For Setting Up An Alternative Communication Path*, U.S. Pat. No. 5,398,236 to Hemmady et al., entitled *Asynchronous Transfer Mode Link Recovery Mechanism*, U.S. Pat. No. 5,502,712 to Akita, entitled *Routing System In Data Communication With Frame Relay Procedure Control*, and U.S. Pat. No. 5,386,412 to Park et al., entitled *Telecommunication System Protocol For Asynchronous Data Communication Between Multiport Switch Control Processor And Information Support Personal Computer Terminal*.

SUMMARY OF THE INVENTION

Therefore, it is an object of the present invention to provide an asynchronous multiport controlling technique, wherein, in order to solve the above-described problem, at least two ports are managed by a single processor for receiving a result frame via another port when one port is down.

To achieve the above object of the present invention, there is provided an asynchronous multiport controlling method in a single processor of a remote security administration system, for example, including a scanning unit for scanning respective subscribers' lines to collect and transmit alarm data, a VAN (value added network) main unit for supervising and controlling an abnormal state to execute safety maintenance, an X.25 interface module for receiving the collected alarm data from the scanning unit to extract and provide only VAN-related data, and interfacing transmission/reception data of the scanning unit, and a VAN interface module for receiving the VAN-related data extracted from the X.25 interface module to perform an asynchronous multiport communication with the VAN main unit. The asynchronous multiport controlling technique in the single processor of the remote security administration system is carried out by collecting the extracted VAN-related data from the X.25 interface module, and searching out a transmitting port after collecting the VAN-related data. Thereafter, the searched transmitting port is checked to determine whether or not it is in a normal state, and a suitable request frame is generated for a prescribed format when the transmitting port is in its normal state to transmit the request frame to the VAN main unit via the searched port. Then, a number of result frames equal to an allotted number of ports after transmitting the request frame are stored in a single buffer.

DETAILED DESCRIPTION OF THE PREFERRED EMBODIMENT

Figure 1:
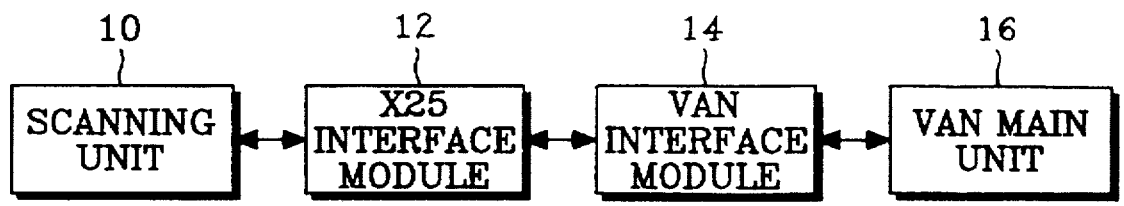
FIG. 1 is a block diagram showing a maintenance apparatus of a remote security administration system according to the present invention.

FIG. 1 is a block diagram showing a maintenance apparatus of a remote security administration system, for example, according to the present invention, which includes a scanning unit 10 for scanning respective subscribers' lines to collect and transmit alarm data, and a value added network (hereinafter simply referred to as a "VAN") main unit 16 for supervising an abnormal state for the purpose of contriving safety maintenance. Additionally, an X.25 interface module 12 receives the collected alarm data from scanning unit 10 to extract and provide only VAN-related data, and interfaces transmission and reception data of scanning unit 10, and a VAN interface module 14 receives the VAN-related data extracted from X.25 interface module 12 for executing asynchronous multiport communication with the VAN main unit 16.

Figure 2:
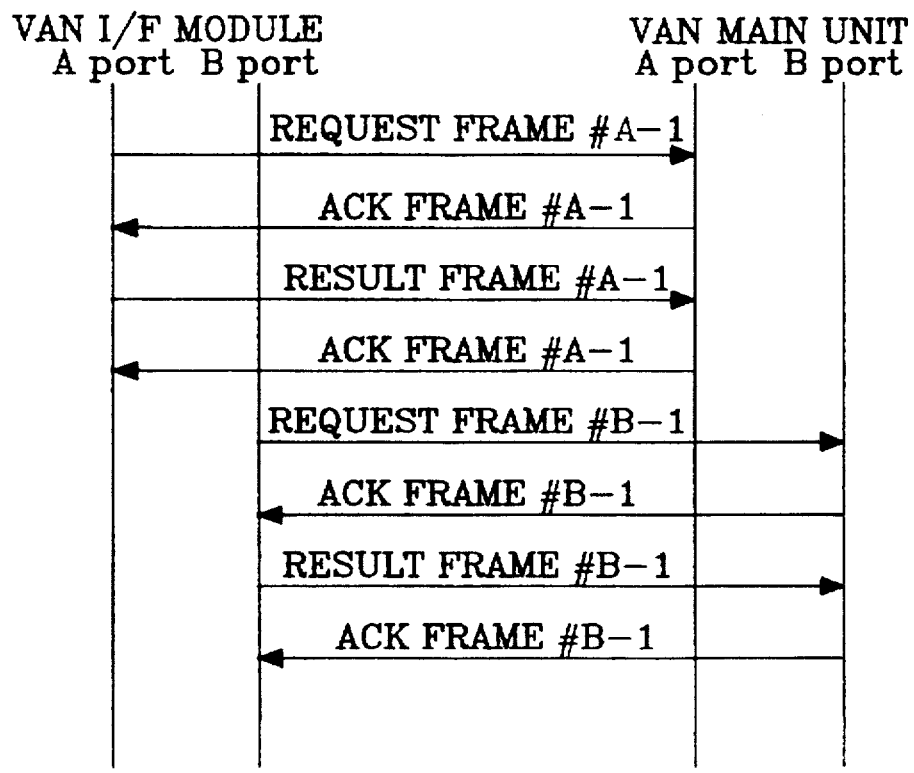
FIG. 2 is a sequential view showing an independent utilizing procedure of respective ports when multiport communication is executed according to the present invention.

FIG. 2 is a sequential view showing an independent utilizing procedure of respective ports when multiport communication is executed according to the present invention. Once a request frame #A-1 is transmitted from an A port of the VAN interface module 14 to the VAN main unit 16, an ACK frame #A-1 is transmitted from the A port of the VAN main unit 16 to the VAN interface module 14. Also, when a result frame #A-1 is transmitted from the A port of the VAN interface module 14 to the A port of the VAN main unit 16, an ACK frame #A-1 is transmitted from the A port of the VAN main unit 16 to the VAN interface module 14. Also, the B port performs a communication sequence in the same manner as the A port.

Figure 3:
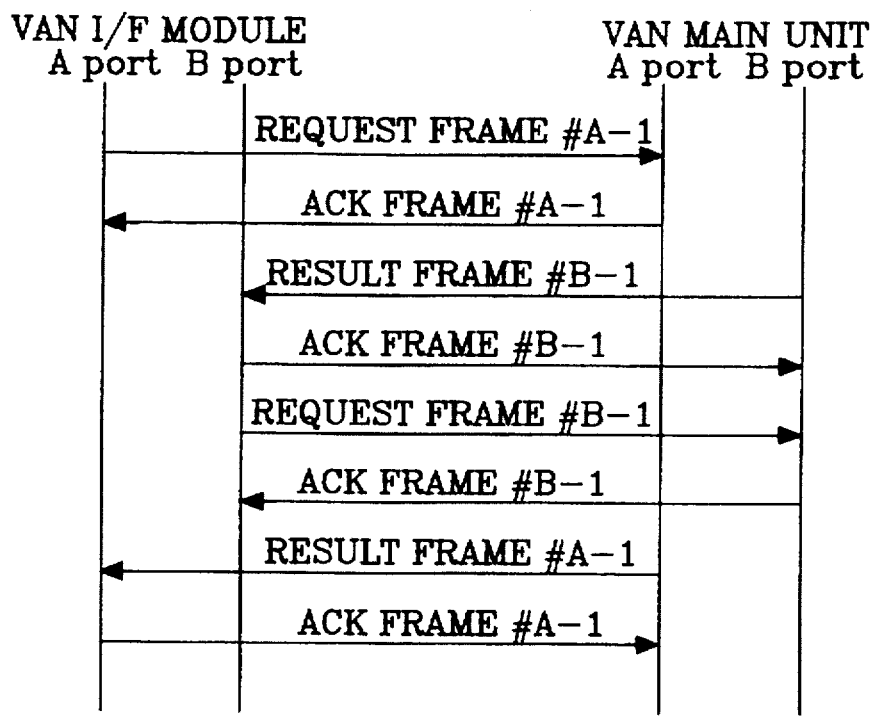
FIG. 3 is a sequential view showing the mutually organic utilizing procedure of respective ports when the multiport communication is executed according to the present invention.

FIG. 3 is a sequential view showing the procedure of respective ports when a multiport communication is executed according to the present invention. Once a request frame #A-1 is transmitted from the A port of the VAN interface module 14 to the A port of the VAN main unit 16, an ACK frame #A-1 is transmitted from the A port of the VAN main unit 16 to the VAN interface module 14. Like this, when a result frame #B-1 is transmitted from the B port of the VAN main unit 16 to the B port of the VAN interface module 14, an ACK frame #B-1 is transmitted from the B port of the VAN interface module 14 to the B port of the VAN main unit 16.

Additionally, if a request frame #B-1 is transmitted from the B port of the VAN interface module 14 to the B port of the VAN interface module 14, an ACK frame #B-1 is transmitted from the B port of the VAN main unit 16 to the B port of the VAN interface module 14. When a result frame #A-1 is transmitted from the A port of the VAN main unit 16 to the A port of the VAN interface module 14, an ACK frame #A-1 is transmitted from the A port of the VAN interface module 14 to the A port of the VAN main unit 16.

Figure 4:
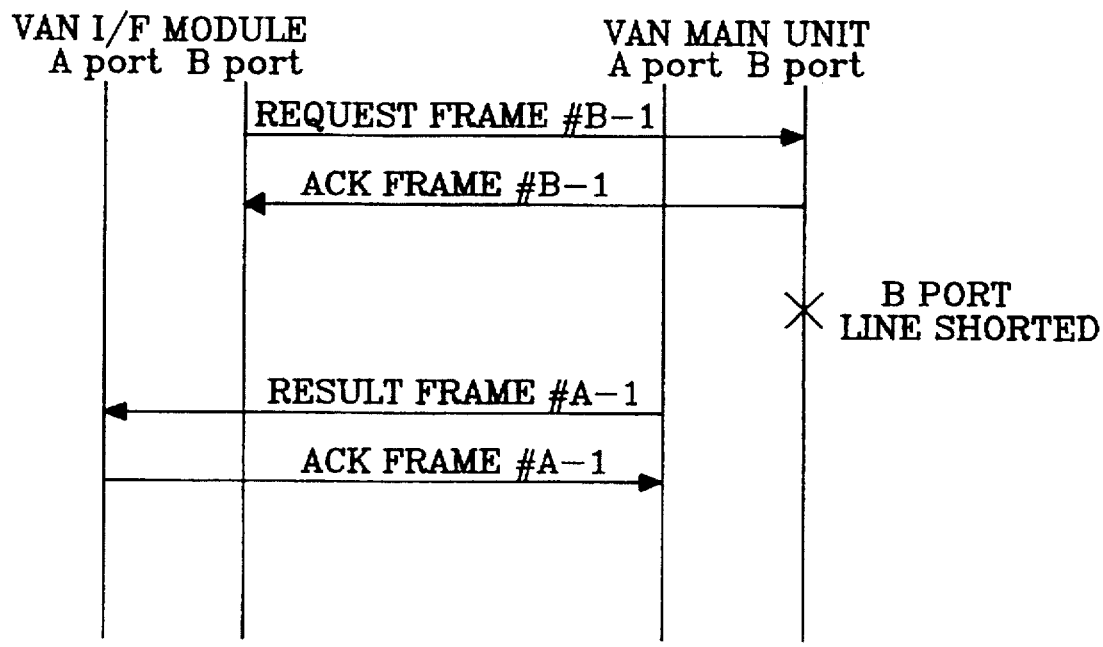
FIG. 4 is a sequential view showing the utilizing procedure when the B port is shorted during a normal operation according to the present invention.

FIG. 4 is a sequential view showing the utilizing procedure when the port B line is shorted during a normal operation according to the present invention. When a request frame #B-1 is transmitted from the B port of the VAN interface module 14 to the B port of the VAN main unit 16, an ACK frame #B-1 is transmitted from the B port of the VAN main unit 16 to the B port of the VAN interface module 14. Even though a short appears at the B port of the VAN main unit 16, the A port is available in the VAN main unit 16. Accordingly, an ACK frame #A-1 is transmitted from the A port of the VAN interface module 14 to the A port of the VAN main unit 16 once result frame #A-1 is transmitted from the VAN main unit 16 to the A port of the VAN interface module 14, thereby carrying out the asynchronous multiport communication.

Figure 5:
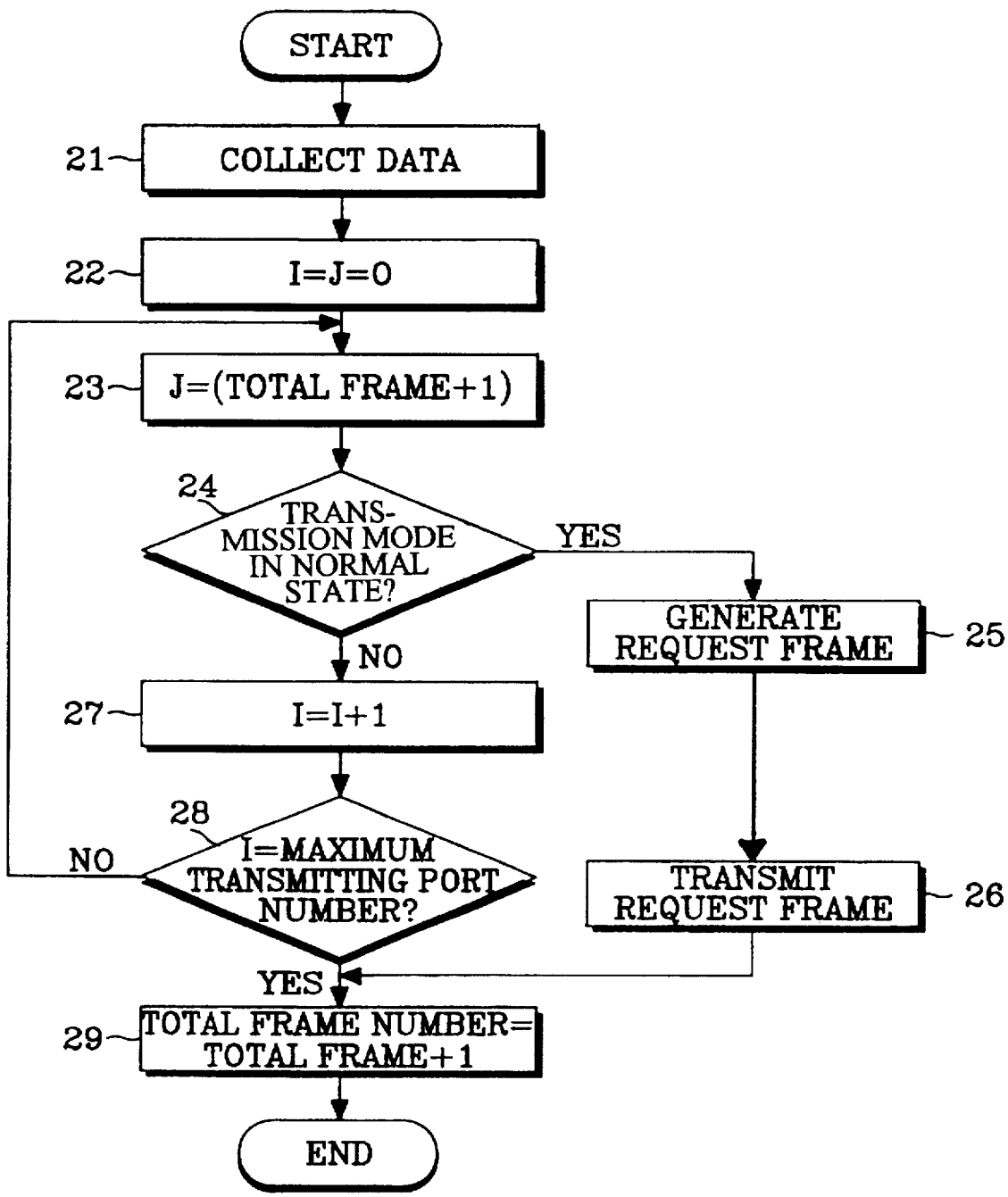
FIG. 5 is a flowchart illustrating the generation and transmission of the request frame according to the present invention.

FIG. 5 is a flowchart illustrating the generation and transmission of the request frame according to the present invention. The VAN interface module 14 collects the alarm data from the X.25 interface module 12 in step 21. A designation value of a channel I and a port J are set to "zero" in step 22, and the port to be transmitted is searched out in step 23. The port to be transmitted is searched out in such a manner that the number of corresponding ports is obtained by calculating the total frame number+1 to be transmitted and the left of the allotted number of ports. After this, it is determined in step 24 whether or not the searched out port to be transmitted is in a normal state. If not, the program proceeds to step 27 to add one to the channel I, and the program proceeds to step 28. Then, the channel calculated in step 28 is checked to determine whether or not it is the maximum transmission port number. The program returns to step 23 when the calculated channel is not the maximum transmission port number. If the calculated channel is the maximum transmission port number, the program proceeds to step 29. The total frame number to be transmitted is calculated by adding one to it in step 29 to select the next port.

However, if the port to be transmitted is determined to be in a normal state in step 24, the program proceeds to step 25 for producing a request frame suitable for a prescribed format. Then, in step 26, the produced request frame is transmitted to the VAN main unit 16.

Figure 6:
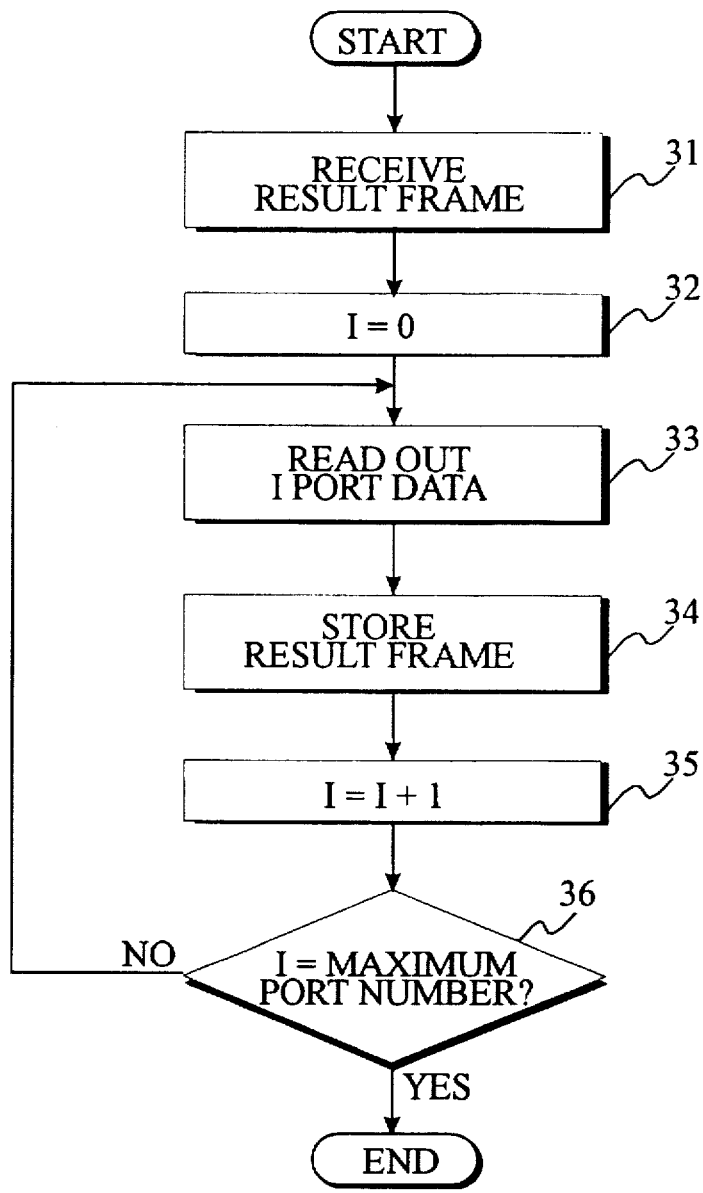
FIG. 6 is a flowchart illustrating the reception of the result frame according to the present invention.

FIG. 6 is a flowchart illustrating the reception of the result frame according to the present invention.

The VAN interface module 14 receives the result frame from the VAN main unit 16 in step 31, and the designation value of channel I is set to "zero" in step 32. After this, received data is read out from the allotted channel port in step 33 and the result frame data is stored in a buffer in step 34. By doing so, there is no trouble occurs free from receiving the result frame via any allotted port. After increasing the channel I by one in step 35, a determination is made as to whether or not the channel I increased by one is equal to the maximum number of ports in step 36. If it is not equal to the maximum number of ports, the program proceeds back to step 33. If the channel I is equal to the maximum number of ports, the program is finished.

Since the several ports are processed in the asynchronous system in the single processor of the remote security administration system as described above, the communication can be executed by another port even though a port is down during the performance of a communication, thereby preventing data loss. Besides, the processing with respect to the same operation is reduced to be effective in sharing the load per port.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of operating an asynchronous multiport system having a single processor and including a scanning unit for scanning respective subscribers' lines to collect and transmit alarm data, a VAN (value added network) main unit for supervising and controlling an abnormal state to execute safety maintenance, an X.25 interface module for receiving said collected alarm data from said scanning unit to extract and provide only VAN-related data, and interfacing transmission and reception data of said scanning unit, and a VAN interface module for receiving said VAN-related data extracted from said X.25 interface module to perform the asynchronous multiport communication with said VAN main unit, comprising the steps of:

collecting said extracted VAN-related data from said X.25 interface module;

searching out a transmitting port after collecting said VAN-related data;

determining whether or not the searched transmitting port is in a normal state;

generating a request frame in a prescribed format when said transmitting port is determined to be in said normal state to transmit said request frame to said VAN main unit via said searched port; and receiving a number of result frames equal to an allotted number of ports after transmitting said request frames and storing said result frames in a single buffer.

2. A method as claimed in claim 1, further comprising a step of searching out another vacant port when said searched transmitting port is determined not to be in a normal state.

* * * * *